US008150309B2

(12) United States Patent
Braithwaite (10) Patent No.: US 8,150,309 B2
(45) Date of Patent: Apr. 3, 2012

(54) STABILITY RECOVERY FOR AN ON-FREQUENCY RF REPEATER WITH ADAPTIVE ECHO CANCELLATION

(75) Inventor: Richard Neil Braithwaite, Orange, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 745 days.

(21) Appl. No.: 11/940,098

(22) Filed: Nov. 14, 2007

(65) Prior Publication Data

US 2008/0113617 A1 May 15, 2008

Related U.S. Application Data (60) Provisional application No. 60/859,152, filed on Nov. 15, 2006.

(51) Int. Cl.
*H04H 40/00* (2008.01)

(52) U.S. Cl. ........... 455/7; 455/15; 455/18; 455/24; 455/78; 370/278; 370/279; 370/342; 379/406.1; 379/406.11; 379/406.13

(58) Field of Classification Search ........ 455/15, 455/18, 24, 78, 114.1–114.3, 119; 370/278–279, 370/282, 286, 289, 293, 315; 379/406.1–406.13
See application file for complete search history.

(56) References Cited

U.S. PATENT DOCUMENTS

| | | | |
|---|---|---|---|
| 6,111,861 A * | 8/2000 | Burgess | 370/286 |
| 6,985,706 B2 * | 1/2006 | Braithwaite | 455/194.2 |
| 7,035,321 B2 * | 4/2006 | Balaberda | 375/213 |
| 7,215,468 B2 | 5/2007 | Nakata | |
| 7,289,773 B2 * | 10/2007 | Braithwaite | 455/91 |
| 2002/0181699 A1 * | 12/2002 | Pham et al. | 379/406.08 |
| 2004/0152433 A1 * | 8/2004 | Braithwaite | 455/194.2 |
| 2005/0009479 A1 * | 1/2005 | Braithwaite | 455/114.3 |
| 2005/0031097 A1 * | 2/2005 | Rabenko et al. | 379/93.31 |
| 2005/0063323 A1 * | 3/2005 | Schenk | 370/286 |
| 2005/0083860 A1 * | 4/2005 | Sankaranarayanan et al. | 370/286 |
| 2005/0215193 A1 | 9/2005 | Kummetz | |
| 2006/0052066 A1 | 3/2006 | Cleveland et al. | |

OTHER PUBLICATIONS

Notification of Transmittal of the International Search Authority, Written Opinion for International Application No. PCT/US07/23807 dated Apr. 18, 2008, 11 pages.
Office Action dated Dec. 22, 2010 from U.S. Appl. No. 12/009,667.

* cited by examiner

*Primary Examiner* — Fayyaz Alam
(74) *Attorney, Agent, or Firm* — OC Patent Law Group (57) ABSTRACT

A wireless repeater includes an internal feedback path for adaptively cancelling an echo between an output antenna and an input antenna. The internal feedback path employs an adaptive algorithm implementing a list having a plurality of list elements. Each list element has one or more echo cancellation parameters and one or more repeater settings. The list may be pruned by employing a minimum distance between elements within the list. A method for stabilizing a wireless repeater includes obtaining an autocorrelation of a signal in a signal path of the repeater, detecting an echo in the signal path based on the autocorrelation, providing a list of elements indicating past successful echo cancellation coefficients and associated repeater settings, and adaptively adjusting an error of the echo cancellation coefficients to cancel the echo in the signal path.

37 Claims, 5 Drawing Sheets

STABILITY RECOVERY FOR AN ON-FREQUENCY RF REPEATER WITH ADAPTIVE ECHO CANCELLATION

CROSS-REFERENCE TO RELATED APPLICATION

The present application claims priority under 35 USC section 119(e) to U.S. Provisional Patent Application Ser. No. 60/859,152, filed Nov. 15, 2006, the disclosure of which is herein incorporated by reference in its entirety.

BACKGROUND OF THE INVENTION

1. Field of the Invention

The present invention relates to radio frequency (RF) repeaters. More particularly, the present invention relates to stability recovery system and method for an on-frequency RF repeater.

2. Description of the Prior Art and Related Information

In a wireless communication system, a mobile unit such as a cellular phone transmits and receives radio frequency (RF) signals to and from cell site base stations. An on-frequency RF repeater receives, filters, and re-transmits the signal of interest at the same frequency and at a higher power level, thus extending base station coverage. If the product of the forward gain of the repeater and coupling between antennas is too high, the repeater will oscillate. In general, this is undesirable. An internal feedback path may be used to compensate for the external coupling between antennas, allowing the forward gain of the repeater to be increased if required. This compensation is referred to as "echo cancellation." However, if the forward gain is increased too high compared to the residual feedback coupling after echo cancellation, the repeater becomes unstable.

Some residual echo after cancellation is acceptable. However, it is desirable to minimize such residual echo. This may be difficult in some applications, especially for large repeater gains or other repeater implementations having difficult cancellation conditions. In the past, repeaters without echo cancellation need to be monitored for stability, and if instability was detected, the forward gain was reduced to return stability. However, for a repeater with digital echo cancellation, both the analog gain and the coefficients of the echo cancellation must be adjusted to restore stability. Therefore, a method is required to restore stability taking into account both the analog gain and the echo cancellation coefficients without requiring the echo cancellation to be reset to zero.

SUMMARY OF THE INVENTION

In view of the foregoing, the following system and methods provide improved stability recovery for an RF repeater with adaptive echo cancellation.

In one aspect, embodiments of the invention provide a wireless repeater, including an input antenna for receiving an input signal, an output antenna for outputting an amplified signal, an amplifier for amplifying the received input signal and providing the output amplified signal to the output antenna, and an internal feedback path for adaptively cancelling an echo between the output antenna and the input antenna by implementing an adaptive algorithm employing a list having a plurality of list elements, each list element comprising one or more echo cancellation parameters and one or more repeater settings.

In one embodiment, the input signal and the output amplified signal of the wireless repeater have the same frequency. The list may include past successful echo cancellation parameters and corresponding repeater settings. The repeater settings may include analog gain settings of the amplifier. In one embodiment, the internal feedback path further comprises a portion of a digital IF stage. The digital IF stage may include a digital signal processor implementing the adaptive algorithm for dynamically updating the list and iteratively cancelling the echo.

In one embodiment, the adaptive algorithm employed by the internal feedback path includes pruning the list for redundant elements.

In one embodiment, the list is indexed using multi-dimensional attribute vectors. Each list element may further include a region number indicating a region of an attribute space of which the element is a member. The region number corresponds to a region marker in the attribute space, and the element is a member of the attribute space of a closest marker to the element.

The wireless repeater may further include means for monitoring a signal autocorrelation in the repeater, and means for detecting an echo within the repeater based on the monitored signal autocorrelation.

In another aspect, embodiments of the invention provide a method for recovering stability of a repeater in a wireless communication system. The method includes providing a list having a plurality of list elements, each list element comprising one or more echo cancellation parameters and one or more associated repeater settings, detecting a current repeater setting, comparing the current repeater setting to those in the list, and selecting an echo cancellation parameter with the most similar repeater setting in the list.

In one embodiment, the repeater settings are configured as a multi-dimensional attribute vector in an attribute space, and the attribute space is divided into a plurality of regions. Each of the list elements may further include a region number indicating a region of the attribute space of which the element is a member. The region number corresponds to a region marker in the attribute space, and the element is a member of the attribute space of a marker closest to the element.

In one embodiment, the method further includes pruning the list for redundant list elements based on a minimum distance between list elements.

In another aspect, embodiments of the invention provide a method for stabilizing a wireless repeater. The method includes obtaining an autocorrelation of a signal in a signal path of the repeater, detecting an echo in the signal path based on the autocorrelation, providing a list of elements indicating past successful echo cancellation coefficients and associated repeater settings, and adaptively employing the echo cancellation coefficients to cancel the echo in the signal path.

In one embodiment, the method further includes dynamically updating the list. In one embodiment, dynamically updating the list includes adding current repeater settings for successful echo cancellation to the list. In another embodiment, the method further includes obtaining distances between elements in the list, and dynamically updating the list further includes pruning the list based on the obtained distances. If instability is detected as determined from comparing the autocorrelation with a first predetermined threshold, the method may further include finding a nearest list element based on distances between the list elements and a current setting of the repeater, reducing the gain to the next lowest gain setting based on the nearest list element, retrieving an element from the list with echo cancellation coefficients corresponding to the next lowest gain setting, and pruning the retrieved element from the list. The method may further include successively reducing the gain using the remaining list elements until stability is restored or the list is empty. If the list becomes empty, the method further includes setting the echo cancellation coefficients to zero and reducing the gain until stability is restored.

In one embodiment, if echo is suppressed as determined from comparing the autocorrelation with a second predetermined threshold, the method further includes adding current repeater settings to the list. The method may further include pruning the list by employing a minimum distance between elements within the list. In one embodiment, the distance is an attribute distance, and pruning the list includes selecting an oldest element from the list, computing attribute distances from the selected oldest element to the remaining elements with a same region of the list, selecting a minimum attribute distance from the computed attribute distances and comparing the minimum attribute distance with a predetermined attribute distance threshold, and deleting an older element among an element pair having the minimum attribute distance if the minimum attribute distance is smaller than or equal to the predetermined attribute distance threshold until the whole list is checked. In another embodiment, the distance is an echo cancellation coefficient distance, and pruning the list includes selecting an oldest element from the list, computing attribute distances from the selected oldest element to the remaining elements with a same region of the list, finding a pair of neighboring elements by selecting a minimum attribute distance from the computed attribute distances, computing a coefficient distance between the pair of neighboring elements, and deleting an older element among the pair of neighboring elements if the computed coefficient distance is smaller than or equal to a predetermined coefficient distance threshold until the whole list is checked.

In one embodiment, pruning the list based on the obtained distances includes pruning the list for redundant elements among neighboring elements. If the obtained autocorrelation is between a first threshold above which the repeater is considered unstable, and a second predetermined threshold below which the echo is considered suppressed, the method may further include estimating an error in the echo cancellation coefficients, and updating the echo cancellation coefficients.

The method may further include reducing coupling between the input antenna and the output antenna by adaptively cancelling the echo, and increasing a forward gain of the repeater if the echo is suppressed.

In one embodiment, the repeater settings are configured as an attribute space, the method further includes dividing the attribute space into a plurality of regions to avoid over pruning. Each of the list elements may further include a region number indicating a region of an attribute space of which the element is a member. The region number corresponds to a region marker in the attribute space, and wherein the element is a member of the attribute space of a marker closest to the element.

In another aspect of the invention, a wireless communication system includes a base station, and an on-frequency repeater for extending the base station coverage. The on-frequency repeater has an input antenna for receiving an input signal, an output antenna for outputting an amplified signal, an amplifier for amplifying the received input signal and providing the amplified output signal to the output antenna, and an internal feedback path for adaptively cancelling an echo between the input antenna and the output antenna and for stabilizing the on-frequency repeater. The internal feedback path includes means for providing a list having a plurality of list elements, each list element comprising one or more echo cancellation parameters, and one or more repeater settings, means for monitoring a signal autocorrelation in the feedback path, and means for adaptively cancelling the echo based on the autocorrelation signal and the list.

In one embodiment, the one or more repeater settings are configured as attribute vectors in an attribute space. Each of the list elements may further include a region number indicating a region of the attribute space of which the list element is a member.

Further aspects of the construction and method of operation of the invention, with additional objects and advantages thereof, will be best understood from the following description of specific embodiments when read in connection with the accompanying drawings.

DETAILED DESCRIPTION OF THE INVENTION

The present invention will now be described, by way of example, for the best mode contemplated by the inventor for carrying out the present invention, in reference with the accompanying drawings. It shall be understood that the following description, together with numerous specific details, may not contain specific details that have been omitted as it shall be understood that numerous variations are possible and thus will be detracting from the full understanding of the present invention. It will be apparent, however, to those skilled in the art, that the present invention may be put into practice while utilizing various techniques.

Embodiments of the present invention provide a system and method for stability recovery in an on-frequency RF repeater. The repeater includes a digital intermediate frequency (IF) stage with internal digital echo cancellation. The gain of the repeater is adjusted outside of the internal digital feedback loop of the echo cancellation, such as within the RF stages at the output side of the repeater. The RF gain of the repeater is set low initially, and then increased to a maximum gain, so that the echo cancellation can adapt incrementally and maintain stability throughout. A preferred embodiment employs an auto-correlation of the repeater signal (input signal plus echoes). The auto-correlation detects echoes reliably when the width of the auto-correlation of the input signal is less than the loop delay of the echo path.

Figure 1:
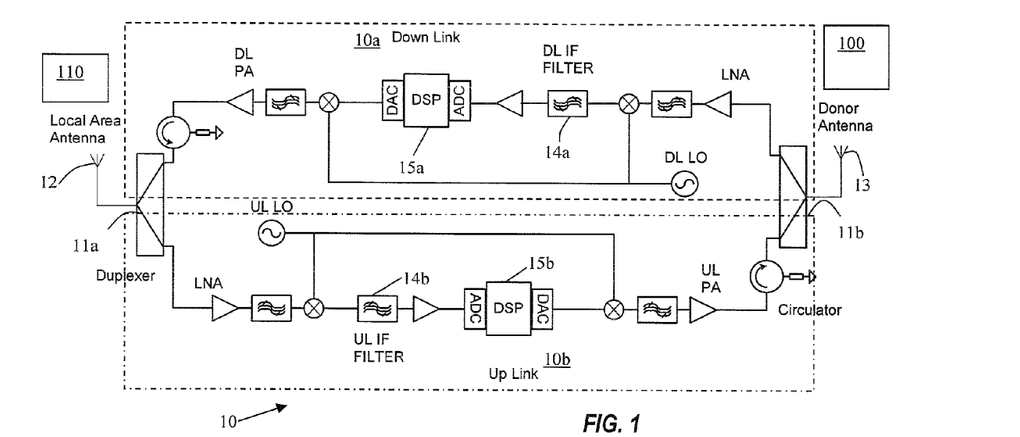
FIG. 1 is block diagram of a bi-directional on-frequency repeater with a digital intermediate frequency (IF) stage.
Figure 2:
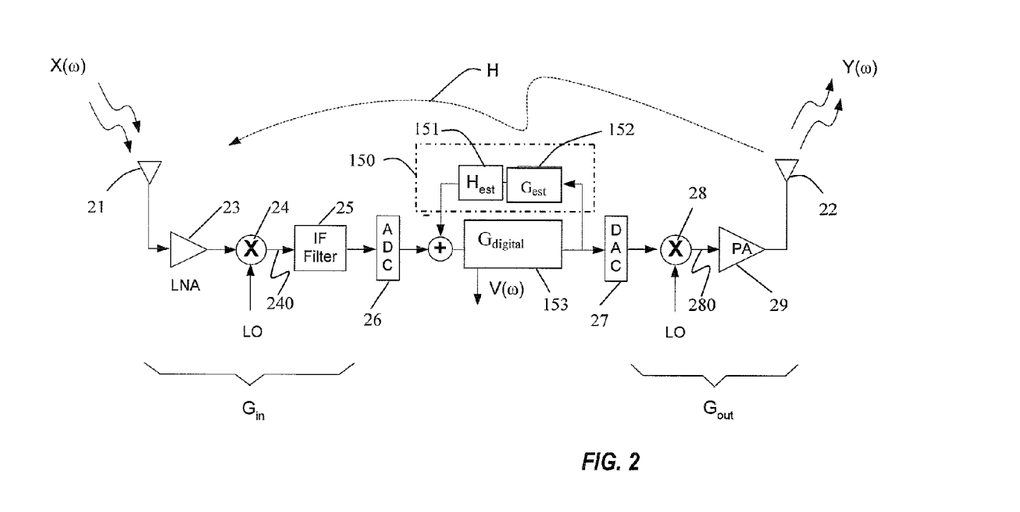
FIG. 2 is a block schematic drawing of one of the paths including the RF coupling between the input and output antennas.

An on-frequency repeater in accordance with embodiments of the invention is shown in FIGS. 1 and 2. A repeater 10 is typically bi-directional, as shown in FIG. 1. The down-link 10a connects the base station 100 to the mobile 110, and the up-link 10b connects the mobile 110 to the base station 100. The repeater 10 may employ a frequency division duplex (FDD) implementation to separate the up- and down-link paths 10a and 10b. The up- and down-links 10a and 10b are separated in frequency requiring different local oscillators (LO). A first duplexer 11a allows the up- and down-links 10a and 10b to share the local area (input) antenna 12 (closest to the mobile 110). A second duplexer 11b and a circulator may be disposed adjacent the donor antenna 13, for example, between a power amplifier (PA) and the donor antenna 13. The second duplexer 11b allows the up- and down-links 10a and 10b to share the donor (output) antenna 13 (closest to the base station 100).

The up- and down-link stages perform substantially the same functions and may use the same components. Bandpass filtering is performed at an intermediate frequency (IF) using filters 14a and 14b. Compensation for the antenna coupling is performed in internal feedback paths within the up- and down-links 10a and 10b. The internal feedback paths may include feedback compensation units within the digital IF stages comprising digital signal processors (DSP) 15a and 15b.

The block diagram shown in FIG. 2 provides more details of the feedback paths within the individual links, 10a and 10b. It also shows the coupling H between the input antenna 21 and the output antenna 22. In accordance with a preferred embodiment of the invention, the echo cancellation is implemented using feedback compensation in a DSP (as shown in FIG. 1). Other embodiments are possible where the DSP-based compensation may be converted to analog, and possibly up-converted in frequency, then coupled to the IF or RF path.

The main components of the repeater as shown in FIG. 2 also include the low noise amplifier (LNA) 23, down-converting mixer 24, IF filter 25, analog-to-digital converter (ADC) 26, DSP (not shown), digital-to-analog converter (DAC) 27, up-converting mixer 28, and power amplifier (PA) 29. As known to those skilled in the art, additional components may be included in the repeater 10. For example, first and second image reject filters may be included and located, e.g., between the LNA 23 and the down-converting mixer 24, and between the up-converting mixer 28 and the power amplifier 29, respectively. A first duplexer 11a is often found between the antenna 21 and LNA 23. A circulator and a second duplexer may be located, e.g., between the PA 29 and the output antenna 22. Additional gain stages may be present at various locations within the RF path 280 and the IF path 240.

The input signal, e.g., the in-coming signal without the effects of feedback, is denoted by x(t). The Fourier transform of x(t) is denoted by X(ω). The output signal and its Fourier transform are denoted by y(t) and Y(ω), respectively. Within FIG. 2, the forward gain of the repeater is represented as the product of the three gain blocks: an analog input gain $G_{in}$, a digital gain, $G_{digital}$, controlled by the DSP, and an analog output gain $G_{out}$. For notational convenience, the analog forward gain is combined, and is denoted by $G_0 = G_{in}G_{out}$. In FIG. 2, the feedback path 150 is the product of the estimate feedback coupling block 151, and the estimate of analog forward gain $G_{est}$ block 152.

The input signal X(ω), although used in the following for modeling, usually cannot be directly measured because it is difficult to separate X(ω) from the output signal Y(ω) through the coupling path H. What can be measured usually is a signal v(t) within a signal path of the repeater, measured prior to the digital gain $G_{digital}$. The external feedback coupling is modeled as $$H(\omega) = \sum_{n=1}^{N} a_n \cdot \exp\{j \cdot \omega \cdot T_n\} \quad \text{(Eq. 1)}$$

where $a_n$ are complex coefficients and $T_n$ are loop delays. The estimate of the feedback coupling has the same form:

$$H_{est}(\omega) = \sum_{n=1}^{N} b_n \cdot \exp\{j \cdot \omega \cdot T_n\} \quad \text{(Eq. 2)}$$

where $b_n$ are complex coefficients.

In the following analysis, the IF filter 25 shown in FIG. 2 is modeled as a delay element within the repeater. This approximation assumes that the passband of the IF filter 25 is flat and that its bandwidth is wider than the spectrum of the input signal of interest. If this assumption is not valid, the estimated feedback coupling, $H_{est}$, will be the product of the actual coupling, H, and the frequency response of the filter. This does not affect the approach to echo cancellation; however, changes in the frequency response or gain of the filter will require re-estimation of the coefficients modeling the product of the feedback coupling and IF filter.

The transfer function of the repeater 10, using the measurement signal v(t), is $$V(\omega) = \frac{G_{in}}{1 - G_{digital} \cdot [G_0 H(\omega) - G_{est} H_{est}(\omega)]} \cdot X(\omega). \quad \text{(Eq. 3)}$$

where $G_0 = G_{in}G_{out}$ and $G_{est}$ approximately equals $G_{in}G_{out}$. The input signal X(ω) usually cannot be measured because the input antenna 21 sums both X(ω) and the coupled signal from the output antenna 22, H(ω)Y(ω). Statistical properties of the measured signal, v(t), may be used to estimate the feedback coupling. In the disclosed embodiment, the power spectrum of v(t) is used in the estimation and subsequent iterative search for the feedback coefficients, $b_n$.

The power spectrum of the measured signal, $S_v(\omega)$, written as a function of the input power spectrum, $S_x(\omega)$, is $$S_v(\omega) = \left| \frac{G_{in}}{1 - G_{digital} \cdot [G_0 H(\omega) - G_{est} H_{est}(\omega)]} \right|^2 \cdot S_x(\omega). \quad \text{(Eq. 4)}$$

The auto-correlation can be computed from the power spectral density, (Eq. 4). The auto-correlation for a loop delay $T_n$ is $$\rho_v(T_n) = \sum_{k=0}^{N} S_v(\omega_k) \cdot \exp\{j \cdot k \Delta \omega \cdot T_n\}. \quad \text{(Eq. 5)}$$

If the input signal can be described as an α-dependent process, then the input signal (without echo) is uncorrelated to itself for delays greater than $T_a$. The echo caused by the feedback appears in the auto-correlation at multiples of the loop delay, $T_{loop}$. When the minimum loop delay is greater than $T_a$, the portion of the auto-correlation associated with the input signal and echo can be separated. In such cases, the auto-correlation is used to monitor stability (maximum magnitude of delay taps associated with the echo) and to refine the feedback coefficient estimates associated with the dominant loop delays. For a repeater with a digital IF stage, it is easy to ensure that the minimum loop delay exceeds $T_a$, although excessively large delays (>10 μs) are discouraged for cellular systems.

Stability of the repeater requires the denominator of (Eq. 4) to be greater than zero. That is, $$[G_0 H(\omega) - G_{est} H_{est}(\omega)] < \frac{1}{G_{digital}}, \quad \text{(Eq. 6)}$$

for all frequencies ω. Stability is monitored using the autocorrelation measurement. If a large echo is detected for any delay greater than $T_a$, the stability is considered questionable. An exemplary predetermined threshold for questionable stability is $$\rho_v(\tau) > 0.35 \cdot \rho_v(0) \text{ for } |\tau| > T_a. \quad \text{(Eq. 7)}$$

The stability recovery method, described later, is then initiated. The selection of the threshold, 0.35 in (Eq. 7), is not critical. Oscillations tend to occur at a single frequency which makes the autocorrelation of the signal v(t) very broad, much wider than that of the desired input signal x(t). As a result, there will be no shortage of delay taps greater than $T_a$ that fail the criterion specified by (Eq. 7) when an oscillation occurs or is imminent.

It is desirable to operate the repeater at its maximum gain. However, without echo cancellation, the repeater may oscillate. Assuming that $G_0 = G_{est}$, it can be seen from (Eq. 6) that the accuracy of the estimate of the feedback coefficients needed to maintain stability is related inversely to the gain of the repeater. As a result, the repeater is set initially to a lower gain so that the feedback can be computed. Once the echo cancellation is working, the gain is increased and the echo cancellation is refined incrementally until the maximum gain is achieved. In doing so, stability is maintained throughout the power ramping.

The echo cancellation is allowed to converge after each gain increase to a predetermined level, e.g., where the maximum correlation outside of the input correlation width is 0.032 (−15 dB below the average power). An echo of −15 dB creates a ripple in the power spectrum of about 3 dB. The error in the feedback coefficient is estimated using $$\begin{bmatrix} \rho_v(T_1) \\ \vdots \\ \rho_v(T_n) \end{bmatrix} = G_0 \cdot Q_{\Delta T} \cdot \begin{bmatrix} \Delta b_1^* \\ \vdots \\ \Delta b_n^* \end{bmatrix} \quad \text{(Eq. 8)}$$

where $$Q_{\Delta T} = \begin{bmatrix} \rho_{v0}(0) & \rho_{v0}(T_1 - T_2) & \cdots & \rho_{v0}(T_1 - T_n) \\ \rho_{v0}(T_2 - T_1) & \rho_{v0}(0) & \cdots & \rho_{v0}(T_2 - T_n) \\ \vdots & \vdots & \ddots & \vdots \\ \rho_{v0}(T_n - T_1) & \rho_{v0}(T_n - T_2) & \cdots & \rho_{v0}(0) \end{bmatrix} \quad \text{(Eq. 9)}$$

and $$\rho_{v0}(\Delta T) = \begin{cases} \rho_v(\Delta T) & \text{when } |\Delta T < T_a| \\ 0 & \text{otherwise.} \end{cases} \quad \text{(Eq. 10)}$$

The estimate of the residual coefficients is the least mean square (LMS) solution of (Eq. 8). The update of the coefficient $b_n$ is $$b_n(t_{i+1}) = b_n(t_i) + \gamma \cdot \Delta b_n, \quad \text{(Eq. 11)}$$

where γ is a convergence constant.

In the above equations, it was assumed that $G_{est} = G_{in} G_{out}$. When the power ramping is implemented by varying the analog gain, either $G_{in}$ or $G_{out}$, the value of $G_{est}$ must be modified. In this approach, $H_{est}$ and $G_{est}$ are estimated together as a product. As a result, the product $H_{est} G_{est}$ changes with each increase in analog gain even if the current echo cancellation is perfect. A variable gain amplifier (VGA) or the combination of a voltage variable attenuator (VVA) and an amplifier controls the analog gain.

The uncertainty in the estimate of $H_{est} G_{est}$ is $$\Delta(H_{est} \cdot G_{est}) \approx G_{est} \cdot \Delta H_{est} + H_{est} \cdot \Delta G_{est}, \quad \text{(Eq. 12)}$$

where $\Delta H_{est}$ and $\Delta G_{est}$ are the uncertainties in $H_{est}$ and $G_{est}$, respectively. Thus, changes in the analog gain tend to introduce errors in the estimate of $H_{est} G_{est}$, which must reconverge. The uncertainty in $G_{est}$ can be reduced by predicting the amount of analog gain change ($\Delta G_0 / G_o$) from changes in the control voltage of the VGA or VVA and updating using $$[H_{est} \cdot G_{est}]_{new} = [H_{est} G_{est}]_{old} \cdot \left(1 + \frac{\Delta G_0}{G_0}\right). \quad \text{(Eq. 13)}$$

Typically, some inaccuracy in the updated $H_{est} G_{est}$ remains because of unmodeled phase shifts introduced by VVA adjustments. As a result, the step size of a gain increase should be modest when nearing the maximum setting to avoid instability.

When using the analog gain to adjust the repeater gain, recovering from instability is more challenging. Stability of the repeater is restored when (Eq. 6) is fulfilled. A sufficient reduction of the digital gain within the internal feedback loop will restore stability; however, $G_{digital}$ does not have enough dynamic range in a typical field programmable gate array (FPGA) implementation based on finite point integers to be used for gain control. As a result, the repeater gain is adjusted using the analog gain $G_0$ ($G_{out}$ or $G_{in}$). It is apparent from (Eq. 6) that reducing $G_0$ in isolation will not guarantee stability. Instead, both $G_0$ and the product $G_{est} H_{est}$ must be altered together to fulfill (Eq. 6), assuming that H is constant.

The stability recovery algorithm uses past information to predict the echo cancellation setting, $G_{est} H_{est}$, to use with the reduced analog gain setting, $G_0$. A list is used as a data structure for storing past successful coefficient settings and correlating them with the analog gain settings. Each element L(n) of the list contains an attribute vector P, a coefficient vector C, a region number r, and a time stamp t:

$$L(n) = [P(n) C(n) r(n) t(n)] \quad \text{(Eq. 14)}$$

where $$P(n) = [p_1(n) \ldots p_M(n)], \quad \text{(Eq. 15)}$$

$$C(n) = [c_1(n) \ldots c_N(n)]. \quad \text{(Eq. 16)}$$

In this example, the attribute vector, P(n), contains the analog gain as a single dimension (M=1): $p_1(n) = G_0(n)$. The coefficient vector, C(n), contains the N taps of the finite impulse response (FIR) filter used for echo canceling (which is the time domain equivalent of $G_{est} H_{est}(\omega)$). The region number, r(n), indicates the region of the attribute space of which the element is a member. The use of the region number, r(n), may prevent over-pruning, as described in more detail below. The time stamp, t(n), is used to distinguish the relative age of the elements within the list. It is possible to expand the attribute vector to multiple dimensions by including other relevant repeater parameters, in addition to the analog gain. This case is discussed in more detail below after the one-dimensional attribute case.

Whenever the autocorrelation for all delays greater than $T_a$ is small, the residual echo is considered sufficiently low. As mentioned earlier, the threshold for echo suppression is chosen as −15 dB below $\rho_v(0)$. Thus, successful echo cancellation settings are identified when $$\rho_v(\tau) < 0.032 \cdot \rho_v(0) \text{ for } |\tau| > T_a. \quad \text{(Eq. 17)}$$

Whenever condition (Eq. 17) is detected, a new element is created and added to the list.

It is important to limit the number of elements within the list to limit processor computation time. To ensure that the list is a compact archive of past successful states, it is necessary to prune redundant elements from the list. Redundant elements are identified using two measures: an attribute distance $d_{attr}$ and a coefficient distance $d_{coef}$. The attribute distance measures separation in the attribute space between elements $n_1$ and $n_2$, which in the one-dimensional case is the absolute difference between analog gains:

$$d_{attr}(n_1, n_2) = |G_0(n_2) - G_0(n_1)|. \quad \text{(Eq. 18)}$$

The coefficient distance measures the separation of elements $n_1$ and $n_2$ in the multi-dimensional coefficient space:

$$d_{coef}(n_1, n_2) = \sqrt{\sum_k w_k \cdot [c_k(n_2) - c_k(n_1)]^2}, \quad \text{(Eq. 19)}$$

where $w_k$ is a weight for coefficient k (usually set to $w_k=1$).

For any element within the list, its nearest neighbor is the element with the smallest attribute distance. Nearest neighbors are checked for redundancy, which occurs if either the attribute or coefficient distance is small. When redundant pairs are detected, the older of the neighboring elements is pruned (removed) from the list. A first and a second pruning processes are summarized in FIG. 3 and FIG. 4, respectively.

Figure 3:
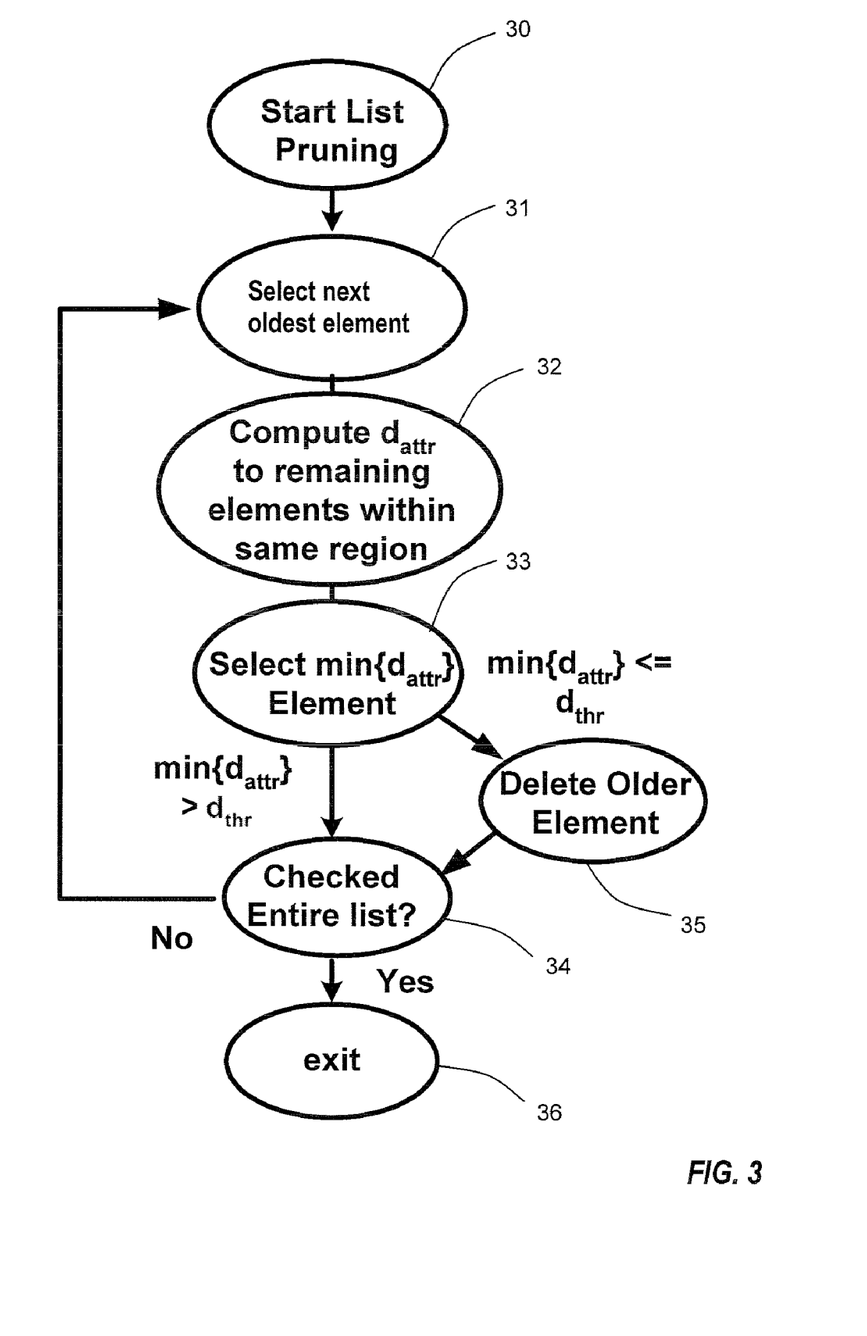
FIG. 3 is a flowchart illustrating a first pruning process that enforces a minimum attribute distance between elements within the list.

In FIG. 3, the first pruning process, which enforces a minimum attribute distance between elements within the list, starts at step 30. In the first iteration of step 31, the oldest element is selected. In step 32, $d_{attr}$ is computed from the oldest element to the remaining elements within the same region. In step 33, an element with minimum $d_{attr}$, min$\{d_{attr}\}$, is selected. Such a minimum attribute distance is compared with a predetermined threshold, $d_{thr}$. If min$\{d_{attr}\} > d_{thr}$, then in step 34 it is determined whether the entire list has been checked. If not, the process goes back to step 31 to select a next oldest element, and repeats until the remaining elements are spaced sufficiently apart with respect $d_{attr}$, or until a lower limit on the list size is reached If yes, the process exits at step 36, and it is deemed that all the elements within the list are spaced sufficiently apart with respect to the attribute distance tolerance. If, on the other hand, in step 33 it was determined that min$\{d_{attr}\} <= d_{thr}$, then in step 35 the older element among the element pair is deleted.

Figure 4:
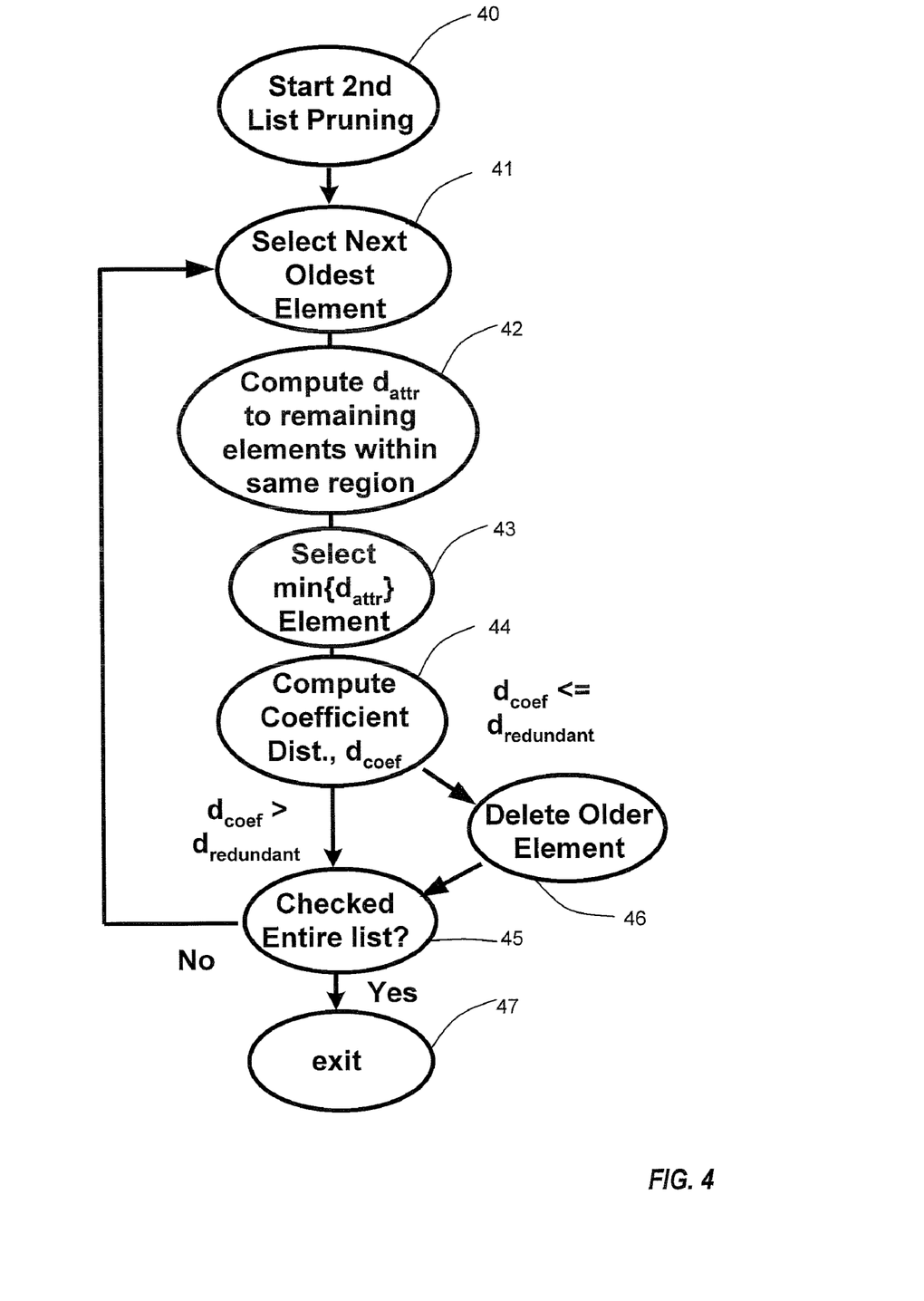
FIG. 4 is a flowchart illustrating a second pruning process that enforces a minimum coefficient distance between neighboring elements within the list.

In FIG. 4, the second pruning process, which enforces a minimum coefficient distance between neighboring elements within the list, starts at step 40. In the first iteration of step 41, the oldest element is selected. In step 42, $d_{attr}$ is computed from the selected oldest element to the remaining elements within the same region. In step 43, an element with minimum $d_{attr}$, min$\{d_{attr}\}$, is selected. Such a selected element is the neighboring, i.e., nearest, element of the oldest element. In step 44, the coefficient distance, $d_{coef}$, is computed between the two elements. If $d_{coef} > d_{redundant}$, then in step 45 it is determined whether the entire list has been checked. If not, the process goes back to step 41 to select a next oldest element. If yes, the process exits at step 47, and it is deemed that all the elements within the list are spaced sufficiently apart with respect to the coefficient distance tolerance. If, on the other hand, in step 44 it was determined that $d_{coef} <= d_{redundant}$, then in step 46 the older element among the element pair is deleted.

When the attribute vector comprises the analog gain only, pruning is also used to remove any element whose analog gain attribute is greater than the present (i.e., current) analog gain.

It is possible to over-prune the list when the analog gain is changing in increments smaller than the minimum attribute distance. This occurs because the new element created deletes the next most recent element, which is within the minimum attribute distance. This can prevent the list from growing in size beyond one element, which is undesirable in general. To avoid over-pruning, the attribute space is divided into regions, denoted by r within (Eq. 14). A set of region markers is specified that are distributed through the attribute space. For each element in the list, the distance is measured to each marker and the element is classified as a member of the region associated with the closet marker. Pruning is limited to redundant pairs within the same region, ensuring that the last element within a region will not be pruned.

For the one-dimensional attribute case, over-pruning can be avoided by making the step size in the analog gain larger than the minimum attribute distance. One method is to quantize the analog gain so that the separation between valid gain settings is larger than the minimum attribute distance. In such cases, the region number r(n) can be removed from the element definition, see (Eq. 14).

A list element is retrieved whenever the instability condition, (Eq. 7), is detected. At this point, the current analog gain is measured and it becomes the current attribute vector. The distances between current attribute vector and each of the list elements whose analog gain is lower are measured. The smallest distance is the nearest list element. It is noted that for the case where the attribute vector has the analog gain only, the nearest element has the largest analog gain within the list due to pruning. The analog gain setting is reduced to the value of the nearest list element's analog gain, and the associated coefficients from the list element are restored to the FIR filter. The element is then pruned from the list. The system reverts to successively lower gain settings remaining within the list until stability is restored. This results in that the oscillation is terminated with the minimum possible gain loss. If the list becomes empty in the process, the FIR filter coefficients of the echo canceller are set to zero, and the analog gain is reduced as much as necessary to make $$G_0 H(\omega) < 1 \quad \text{(Eq. 20)}$$

for all frequencies $\omega$.

Figure 5:
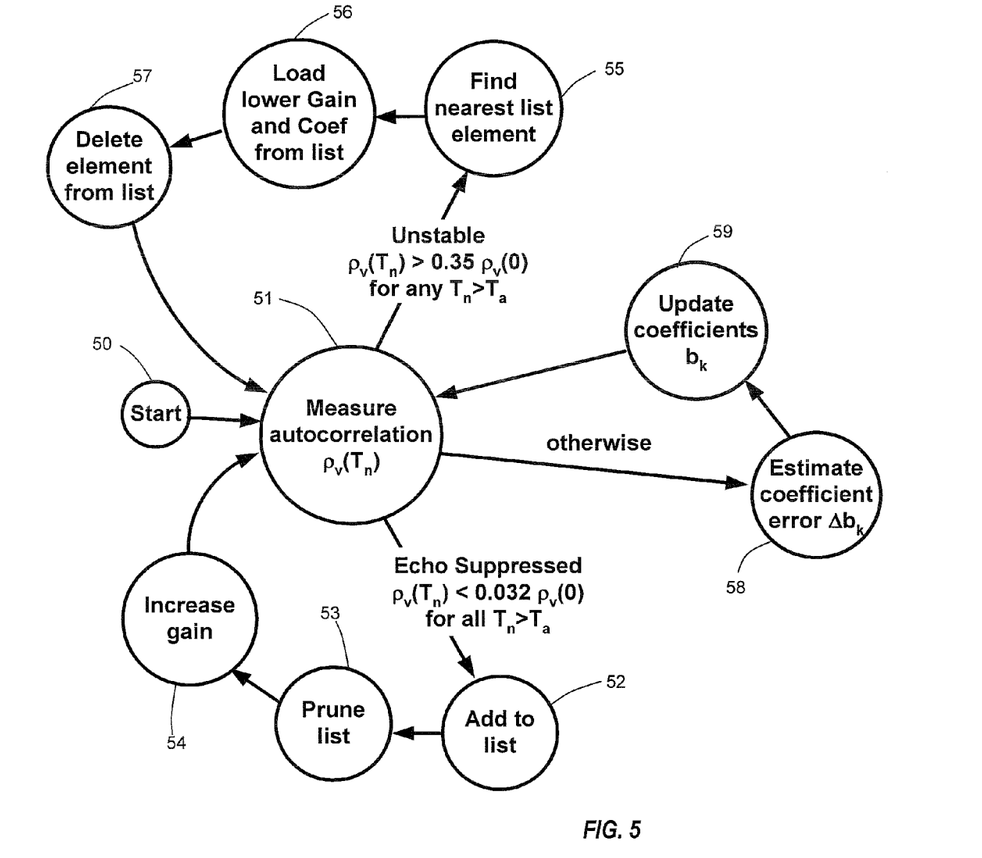
FIG. 5 is a diagram illustrating the list-based stability recovery algorithm for repeater with digital IF and echo cancellation.

The list-based stability recovery algorithm for a repeater with digital IF and echo cancellation is summarized in FIG. 5. The process starts at step 50. In step 51, the autocorrelation, $\rho_v(T_n)$ as defined in (Eq. 5), is measured. If the echo is suppressed, e.g., when (Eq. 17) is satisfied for any $\tau = T_n > T_a$, then the element is added back to the list in step 52. Subsequently, the list can be pruned in step 53 and the gain increased in 54, and the autocorrelation is measured again back in step 51. If the feedback is unstable, e.g., (Eq. 7) is satisfied, then in step 55 a nearest list element is found, which has a smallest attribute distance from the current settings of the repeater. In step 56, a lower gain and corresponding coefficients are loaded from the list. In step 57, the element is deleted from the list, and the process goes back to step 51.

This process may be repeated successively to reduce the gain using the remaining list elements until stability is restored, or until the list is empty. If the list becomes empty, the process proceeds to setting the echo cancellation coefficients to zero and reducing the forward gain until stability is restored.

If otherwise the measured autocorrelation is in between the "echo suppressed" and "unstable" conditions, then in step 58 the coefficient error $\Delta b_k$ is measured, and the coefficients $b_k$ are updated in step 59, then the process goes back to step 51.

This list technique may further include the techniques of U.S. patent application Ser. No. 10/889,636 filed Jul. 12, 2004, and U.S. Pat. No. 6,985,706, the disclosures of which are incorporated herein by reference in their entirety.

There are several repeater settings, in addition to analog gain, that affect the estimation of $G_{est}H_{est}(\omega)$. As a result, the attribute vector preferably should become multi-dimensional. It is shown below that the list-based stability recovery scales up easily to multiple attribute dimensions.

As mentioned earlier, the IF filter limits the bandwidth of the repeater. Its effect is modeled as part of the feedback coupling $H_{est}(\omega)$. Changing the IF or RF filtering adjusts the frequency response of the repeater. In general, this will have a direct effect on the echo cancellation coefficients because the filtering is performed outside of the cancellation loop.

The frequency response of the repeater can be altered using digital filtering. This may be done to narrow the bandwidth of the repeater to a specific channel or to equalize the power of signals within different channels received by the repeater. If the digital filtering is performed within the internal cancellation loop, the digital gain $G_{digital}$ becomes a function of frequency, i.e., $G_{digital}(\omega)$. Since $G_{digital}(\omega)$ is within the cancellation loop, it will not affect the coefficients directly, but it may affect the weighting used in the least square estimation which in turn may alter the coefficients. If the digital filtering is performed outside of the cancellation loop, the frequency response would be included within $H_{est}(\omega)$.

Each relevant parameter setting that can be adjusted during the operation of the repeater contributes an additional dimension to the attribute vector. Despite the attribute vector becoming multi-dimensional, the concept of the nearest neighbor remains true. The attribute distance between elements $n_1$ and $n_2$ becomes $$d_{attr}(n_1, n_2) = \sqrt{\sum_k s_k \cdot [p_k(n_2) - p_k(n_1)]^2}, \quad \text{(Eq. 21)}$$

where $s_k$ are weights proportional to the sensitivity of the echo magnitude to changes in the individual attribute $p_k$. The nearest neighbor has the minimum attribute distance. The concept of regions also scales up to multiple dimensions. The distance separating the element $n_1$ and the marker r is similar to (Eq. 21). That is, $$d_{marker}(n_1, r) = \sqrt{\sum_k s_k \cdot [p_k(n_1) - p_k(r)]^2}. \quad \text{(Eq. 22)}$$

Figure 6:
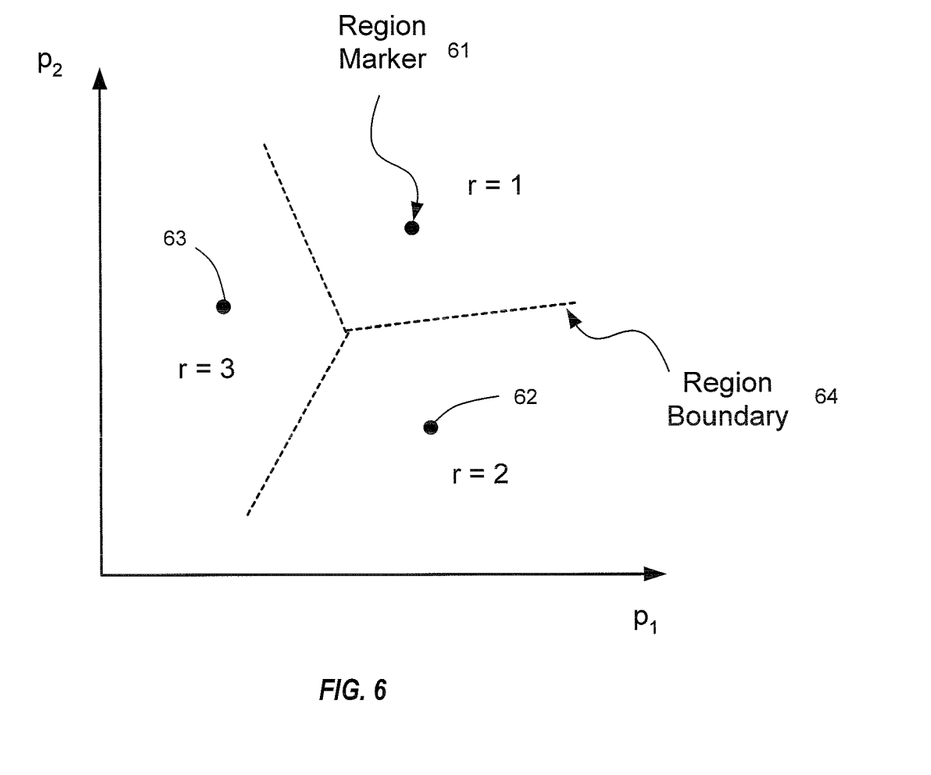
FIG. 6 is a plot of regions defined by three region markers in a two-dimensional attribute space.

As in the one-dimensional case, the element $n_1$ is a member of the region r defined by the closet marker (minimum $d_{marker}(n_1, r)$). The markers and the regions they define in a two-dimensional attribute space are shown in FIG. 6. In this exemplary case, three regions are defined by three region markers 61, 62, and 63 in a two-dimensional attribute space having an axis $p_1$ and an axis $p_2$. The regions are separated by region boundaries 64.

When the attribute vector contains multiple dimensions, it is not beneficial to prune list elements whose analog gain is higher than the present analog gain. This is due to the fact that instability may be a result of changing the IF filtering or other parameter instead of the analog gain. However, when searching for the nearest element to the present attribute vector, only elements having lower analog gains should be considered for the purpose of stability recovery. Elements selected during the recovery process are still deleted as in the one-dimensional attribute case.

Advantageously, embodiments of the invention provide the list-based approach to stability recovery with a minimized amount of lost gain. By remembering and reusing successful parameter settings, the stability of the repeater can be quickly recovered. In addition, the self-generating features and the pruning process improves efficiency in cancelling echo and recovering stability of the repeater.

The present invention has been described in relation to a presently preferred embodiment, however, it will be appreciated by those skilled in the art that a variety of modifications, too numerous to describe, may be made while remaining within the scope of the present invention. Accordingly, the above detailed description should be viewed as illustrative only and not limiting in nature.

What is claimed is:

1. A wireless repeater, comprising:
   an input antenna for receiving an input signal;
   an output antenna for outputting an amplified signal;
   an amplifier for amplifying the received input signal and providing the output amplified signal to the output antenna; and
   an internal feedback path for adaptively cancelling an echo between the output antenna and the input antenna by measuring echo cancellation and implementing an adaptive algorithm employing one or more measured repeater settings and a list having a plurality of list elements, each list element comprising one or more adaptively updated echo cancellation parameters and one or more analog repeater settings.

2. A wireless repeater as set out in claim 1, wherein the input signal and the output amplified signal have the same frequency.

3. A wireless repeater as set out in claim 1, wherein the list comprises past successful echo cancellation parameters and corresponding repeater settings.

4. A wireless repeater as set out in claim 1, wherein the repeater settings comprise analog gain settings of the amplifier.

5. A wireless repeater as set out in claim 1, wherein the internal feedback path further comprises a portion of a digital IF stage.

6. A wireless repeater as set out in claim 5, wherein the digital IF stage comprises a digital signal processor implementing the adaptive algorithm for dynamically updating the list and iteratively cancelling the echo.

7. A wireless repeater as set out in claim 6, wherein the algorithm further comprises pruning the list for redundant elements.

8. A wireless repeater as set out in claim 1, wherein the list is indexed using multi-dimensional attribute vectors.

9. A wireless repeater as set out in claim 1, wherein each of the list elements further comprises a region number indicating a region of an attribute space of which the element is a member.

10. A wireless repeater as set out in claim 9, wherein the region number corresponds to a region marker in the attribute space, and wherein the element is a member of the attribute space of a closest marker to the element.

11. A wireless repeater as set out in claim 1, further comprising:
means for monitoring a signal autocorrelation in the repeater; and
means for detecting an echo within the repeater based on the monitored signal autocorrelation.

12. A method for recovering stability of a repeater in a wireless communication system, comprising:
providing a list having a plurality of list elements employing an adaptive algorithm employing measured echo cancellation, each list element comprising one or more echo cancellation parameters and one or more associated analog repeater settings;
detecting a current analog repeater setting;
comparing the current detected repeater setting to those in the list; and
selecting an echo cancellation parameter associated with the most similar repeater setting in the list.

13. A method as set out in claim 12, wherein the repeater settings are configured as a multi-dimensional attribute vector in an attribute space, and wherein the attribute space is divided into a plurality of regions.

14. A method as set out in claim 13, wherein each of the list elements further comprises a region number indicating a region of the attribute space of which the element is a member.

15. A method as set out in claim 14, wherein the region number corresponds to a region marker in the attribute space, and wherein the element is a member of the attribute space of a marker closest to the element.

16. A method as set out in claim 12, further comprising:
pruning the list for redundant list elements based on a minimum distance between list elements.

17. A method for stabilizing a wireless repeater, comprising:
obtaining an autocorrelation of a signal in a signal path of the repeater;
detecting an echo in the signal path based on the autocorrelation;
providing a list of elements indicating past successful echo cancellation coefficients and associated past measured analog repeater settings; and
adaptively employing the echo cancellation coefficients to cancel the echo in the signal path employing measured echo cancellation.

18. A method as set out in claim 17, further comprising: dynamically updating the list.

19. A method as set out in claim 18, wherein dynamically updating the list comprises adding current repeater settings for successful echo cancellation to the list.

20. A method as set out in claim 19, further comprising: obtaining distances between elements in the list,
wherein dynamically updating the list further comprises pruning the list based on the obtained distances.

21. A method as set out in claim 20, wherein if instability is detected as determined from comparing the autocorrelation with a first predetermined threshold, the method further comprises:
finding a nearest list element based on distances between the list elements and a current setting of the repeater;
reducing a gain of the repeater to the next lowest gain setting based on the nearest list element;
retrieving an element from the list with echo cancellation coefficients corresponding to the next lowest gain setting; and
pruning the retrieved element from the list.

22. A method as set out in claim 21, further comprising:
successively reducing the gain using the remaining list elements until stability is restored or the list is empty.

23. A method as set out in claim 22, further comprising:
if the list becomes empty, setting the echo cancellation coefficients to zero and reducing the gain until stability is restored.

24. A method as set out in claim 20, wherein if echo is suppressed as determined from comparing the autocorrelation with a second predetermined threshold, the method further comprises:
adding current repeater settings to the list.

25. A method as set out in claim 24, further comprising;
pruning the list by employing a minimum distance between elements within the list.

26. A method as set out in claim 25, wherein the distance is an attribute distance, and wherein pruning the list comprises:
selecting an oldest element from the list;
computing attribute distances from the selected oldest element to the remaining elements with a same region of the list;
selecting a minimum attribute distance from the computed attribute distances and comparing the minimum attribute distance with a predetermined attribute distance threshold; and
deleting an older element among an element pair having the minimum attribute distance if the minimum attribute distance is smaller than or equal to the predetermined attribute distance threshold until the whole list is checked.

27. A method as set out in claim 25, wherein the distance is an echo cancellation coefficient distance, and wherein pruning the list comprises:
selecting an oldest element from the list;
computing attribute distances from the selected oldest element to the remaining elements with a same region of the list;
finding a pair of neighboring elements by selecting a minimum attribute distance from the computed attribute distances;
computing a coefficient distance between the pair of neighboring elements; and
deleting an older element among the pair of neighboring elements if the computed coefficient distance is smaller than or equal to a predetermined coefficient distance threshold until the whole list is checked.

28. A method as set out in claim 20, wherein pruning the list based on the obtained distances comprises pruning the list for redundant elements among neighboring elements.

29. A method as set out in claim 20, wherein if the obtained autocorrelation is between a first threshold above which the repeater is considered unstable, and a second predetermined threshold below which the echo is considered suppressed, the method further comprises:
estimating an error in the echo cancellation coefficients; and
updating the echo cancellation coefficients.

30. A method as set out in claim 17, further comprising reducing coupling between the input antenna and the output antenna by adaptively cancelling the echo.

31. A method as set out in claim 30, further comprising increasing a forward gain of the repeater if the echo is suppressed.

32. A method as set out in claim 17, wherein the repeater settings are configured as an attribute space, the method further comprising dividing the attribute space into a plurality of regions to avoid over pruning.

33. A method as set out in claim 32, wherein each of the list elements further comprises a region number indicating a region of an attribute space of which the element is a member.

34. A method as set out in claim 33, wherein the region number corresponds to a region marker in the attribute space, and wherein the element is a member of the attribute space of a marker closest to the element.

35. A wireless communication system, comprising:
   a base station; and
   an on-frequency repeater for extending the base station coverage, wherein the on-frequency repeater comprises:
      an input antenna for receiving an input signal;
      an output antenna for outputting an amplified signal;
      an amplifier for amplifying the received input signal and providing the amplified output signal to the output antenna; and
      an internal feedback path for adaptively cancelling an echo between the input antenna and the output antenna and for stabilizing the on-frequency repeater employing measured echo cancellation,
   wherein the internal feedback path comprises:
      means for providing a list having a plurality of list elements, each list element comprising one or more echo cancellation parameters, and one or more associated measured analog repeater settings;
      means for monitoring a signal autocorrelation in the feedback path; and
      means for adaptively cancelling the echo based on the autocorrelation signal and the list.

36. A wireless communication system of claim 35, wherein the one or more repeater settings are configured as attribute vectors in an attribute space.

37. A wireless communication system of claim 36, wherein each of the list elements further comprises a region number indicating a region of the attribute space of which the list element is a member.

* * * * *